United States Patent
Newton

(10) Patent No.: US 7,311,225 B2
(45) Date of Patent: Dec. 25, 2007

(54) FIXED RATIO SYSTEM FOR METERING AND MIXING THE LIQUID COMPONENTS OF A NON-CARBONATED BEVERAGE OR THE LIKE

(75) Inventor: John R. Newton, 6245 105th Pl., Sebastian, FL (US) 32958

(73) Assignee: John R. Newton, Vero Beach, FL (US)

( * ) Notice: Subject to any disclaimer, the term of this patent is extended or adjusted under 35 U.S.C. 154(b) by 400 days.

(21) Appl. No.: 11/018,166

(22) Filed: Dec. 21, 2004

(65) Prior Publication Data

US 2005/0155984 A1 Jul. 21, 2005

Related U.S. Application Data

(60) Provisional application No. 60/531,805, filed on Dec. 22, 2003.

(51) Int. Cl.
*B67D 5/60* (2006.01)
(52) U.S. Cl. ............... 222/145.5; 222/129.1; 222/145.1; 222/145.6
(58) Field of Classification Search ............ 222/145.5, 222/145.6, 145.1, 129.1, 129.2, 129.3, 129.4, 222/135; 137/884
See application file for complete search history.

(56) References Cited

U.S. PATENT DOCUMENTS 1,645,320 A * 10/1927 De Armond et al. ...... 99/323.2
3,112,844 A * 12/1963 Keller et al. ................... 222/61
3,902,636 A * 9/1975 Zilk ......................... 222/129.1
4,043,486 A * 8/1977 Wisbey ....................... 222/134
4,674,658 A * 6/1987 Van Brocklin .............. 222/135
5,064,100 A * 11/1991 Mural ......................... 222/143
5,899,362 A * 5/1999 Moran ......................... 222/136
6,669,053 B1 * 12/2003 Garson et al. ................. 222/61

* cited by examiner

*Primary Examiner*—Frederick C. Nicolas
(74) *Attorney, Agent, or Firm*—Gauthier & Connors LLP

(57) ABSTRACT

Apparatus for delivering a non-carbonated beverage mixture comprises a manifold having a mixing chamber. A first inlet orifice is in communication with and is sized to admit a metered flow of a first liquid into the mixing chamber. A second inlet orifice is in communication with and is sized to admit a metered flow of a second liquid into the mixing chamber. The first and second liquids are combined into a mixture in the mixing chamber. An outlet communicates with the mixing chamber. The mixture exits the manifold through the outlet. A first constant flow valve is in communication with the first inlet orifice and is configured to provide a constant flow of the first liquid to the first inlet. A second constant flow valve is in communication with the second inlet orifice and is configured to provide a constant flow of the second liquid to the second inlet. A dispensing mechanism is in communication with the outlet.

9 Claims, 2 Drawing Sheets

FIXED RATIO SYSTEM FOR METERING AND MIXING THE LIQUID COMPONENTS OF A NON-CARBONATED BEVERAGE OR THE LIKE

CROSS REFERENCE TO RELATED APPLICATIONS

This application claims the benefit of U.S. Provisional Application No. 60/531,805, filed Dec. 22, 2003.

BACKGROUND OF THE INVENTION

1. Field of the Invention

This invention relates generally to non-carbonated drink dispensers and the like, and is concerned in particular with an improved apparatus for consistently delivering and mixing metered amounts of multiple liquids, for example, a flavored syrup and water.

2. Description of the Prior Art

In the conventional non-carbonated beverage dispenser, a juice concentrate or flavored syrup is mixed and delivered by a pump powered by municipal water pressure. The pump pulses, with different numbers of pulses being assigned to each liquid in order to deliver a desired mix ratio. Thus, for example, one pulse of syrup or concentrate and four pulses of water will yield a 4:1 ratio.

There are a number of problems associated with this type of delivery system. These include poor mixture of the liquids being dispensed, back flow of water into the syrup or concentrate unless check valves are installed, jamming of the pump caused by inadequate water pressure, which in turn requires disassembly or replacement of the pump, frequent maintenance of the pump, the need for water pressure regulators in order to safeguard the pump from damage caused by pressure spikes, and variable liquid flow rates caused by variations in water pressure.

There exists a need therefore for an improved delivery system that avoids or at least substantially minimizes the aforesaid problems.

SUMMARY OF THE INVENTION

In accordance with a general aspect of the present invention, a liquid metering and delivery system centers on the use of constant flow valves connected via precise metering orifices to a manifold chamber. Liquids are delivered at variable pressures to the valves, and the valves in turn function to deliver constant volume liquid flows via the metering orifices to the manifold chamber. The metering orifices establish the desired liquid ratio, with the metered liquid components undergoing mixing in the manifold chamber before being delivered to a dispenser.

In accordance with a more detailed aspect of the present invention, apparatus for delivering a non-carbonated beverage mixture comprises a manifold having a mixing chamber. A first inlet orifice is in communication with and is sized to admit a metered flow of a first liquid into the mixing chamber. A second inlet orifice is in communication with and is sized to admit a metered flow of a second liquid into the mixing chamber. The first and second liquids are combined into a mixture in the mixing chamber. An outlet communicates with the mixing chamber. The mixture exits the manifold through the outlet. A first constant flow valve is in communication with the first inlet orifice and is configured to provide a constant flow of the first liquid to the first inlet. A second constant flow valve is in communication with the second inlet orifice and is configured to provide a constant flow of the second liquid to the second inlet. A dispensing mechanism is in communication with the outlet.

In another aspect of the present invention, a housing encloses the mixing chamber, at least part of the outlet, and at least part of the first and second constant flow valves. A first constant flow valve comprises a first tubular outlet configured to form a seal with the manifold and the second constant flow valve comprises a second tubular outlet configured to form a seal with the manifold. The manifold has a first branch conduit in communication with the first inlet orifice and configured to receive the tubular outlet of the first constant flow valve. The manifold has a second branch conduit in communication with the second inlet orifice and configured to receive the tubular outlet of the second constant flow valve. A first o-ring is disposed between the first tubular outlet and the first branch conduit to form a seal between the manifold and the first constant flow valve. A second o-ring is disposed between the second tubular outlet and the second branch conduit to form a seal between the manifold and the second constant flow valve. A discrete supply of the first liquid is in communication with the first constant flow valve. A pump moves the first liquid from the discrete supply to the first constant flow valve. The apparatus is connected to a municipal water supply. The first constant flow valve has a first inlet. The apparatus includes a pump in communication with the first inlet. The second constant flow valve has a second inlet in communication with the municipal water supply.

These and other features and advantages of the present invention will now be described in greater detail with reference to the accompanying drawings, wherein:

DETAILED DESCRIPTION

Figure 1:
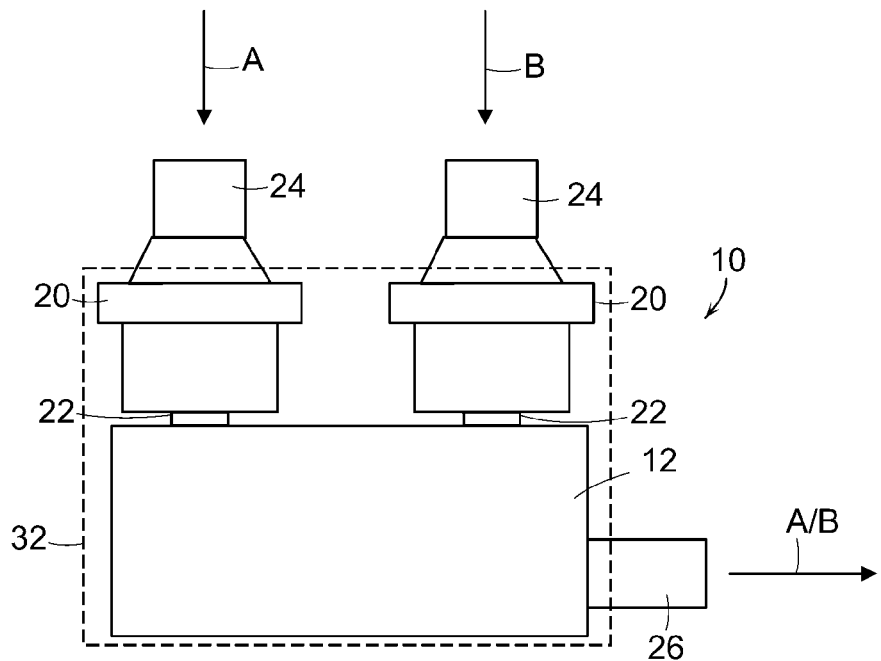
FIG. 1 is a view in side elevation of a valve/manifold assembly in accordance with the present invention.
Figure 2:
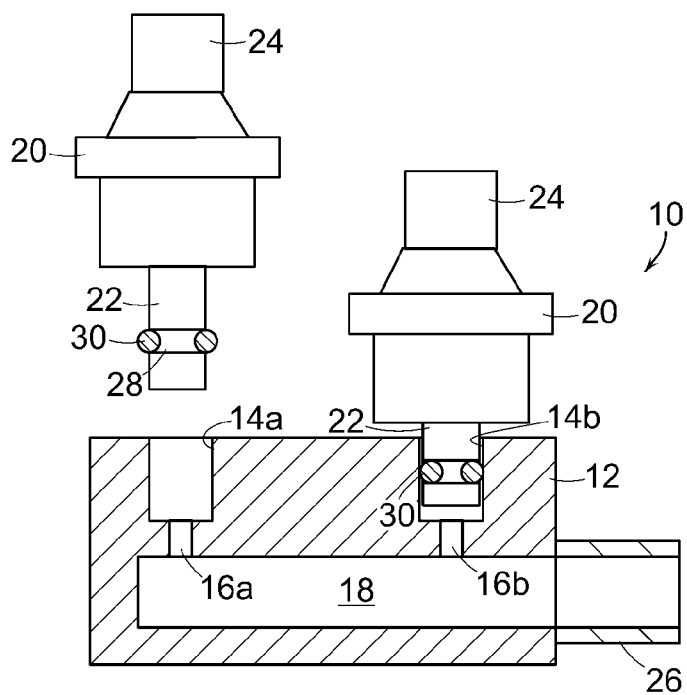
FIG. 2 is a vertical sectional view through the manifold housing, with one of the valves removed from its seated position.

With reference to the drawings, a valve/manifold assembly in accordance with the present invention is generally depicted at 10. The assembly includes a manifold block or housing 12 internally configured with branch conduits 14a, 14b respectively connected by metering ports 16a, 16b to a common manifold chamber 18. Constant flow valves 20 have their tubular outlets 22 received in the branch conduits 16a, 16b. The valves are of the type disclosed, for example, in U.S. Pat. Nos. 6,026,850 and 6,209,578, the descriptions of which are herein incorporated by reference.

Liquid components "A", "B" are received by the valve inlets 24 and are delivered via the valve outlets 22 through the metering ports 16a, 16b into the manifold chamber 18 where they are mixed together and delivered as a mixture A/B from the housing via an outlet port 26.

The valves 20 are designed to deliver a constant volume, irrespective of pressure variations of the incoming liquids, and the metering ports 16a, 16b are sized to deliver a predetermined fixed ratio of the liquids to the manifold chamber 18.

The valve outlets 22 are preferably grooved as at 28 to accommodate O-ring seals 30 which serve to sealingly engage the interior walls of the branch conduits 14a, 14b. The valves and manifold block may advantageously be captured and held together within a housing 32 which may be constructed as a tamper proof enclosure.

Figure 3:
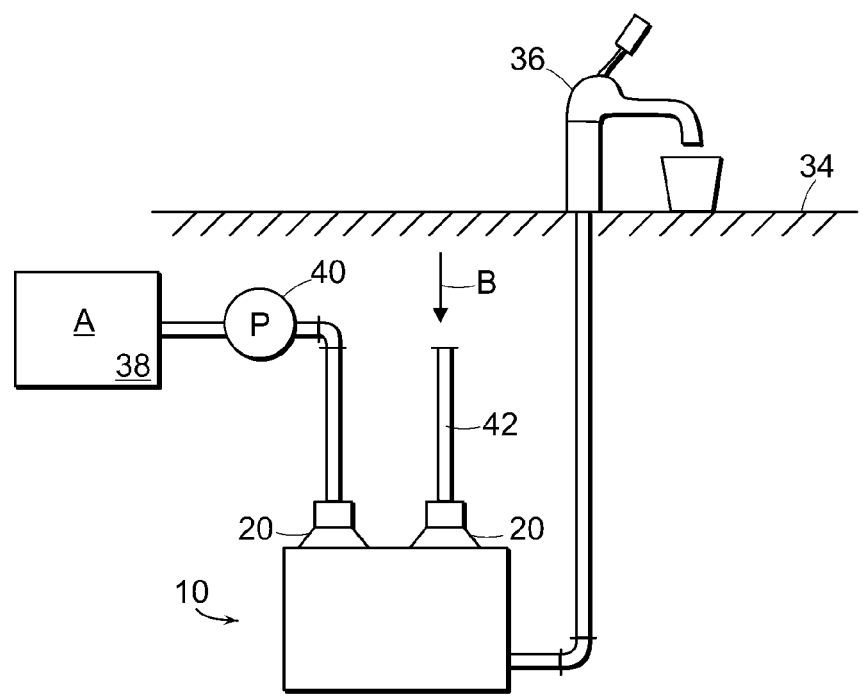
FIG. 3 is a diagrammatic illustration of a liquid delivery system incorporating the valve/manifold assembly shown in FIGS. 1 and 2.

As can be best seen in FIG. 3, in a delivery system for non-carbonated beverages, the valve/manifold assembly 10 may, for example, be situated below a service counter 34 supporting a hand operated dispenser 36. A supply of syrup or concentrate A is connected via a pump 40 to one of the valves 20, and a supply 42 of municipal tap water comprises the liquid B and is connected to the other valve 20. The pump 40 may be of any known type, typically electrically driven or powered by compressed $CO_2$. The pump 40 will deliver the liquid A to its respective valve 20 at varying pressures within a predetermined range governed by associated controls (not shown). The pressure of liquid B will also vary, as is normal for example with municipal water systems.

When the dispenser 36 is closed, the entire system is pressurized, and there is no flow of either of the liquids A, B through the valve/manifold assembly. When the dispenser is opened and the pressure in manifold chamber 18 drops below the pressure setting of the valves 20, metered flow commences.

The valves 20 will function to deliver constant liquid flows to their respective metering orifices 16a, 16b, and the latter will in turn function to deliver a constant fixed ratio of the liquids A, B to the chamber 18 where they will undergo mixing before being delivered to the dispenser 36.

In light of the foregoing, it will now be appreciated by those skilled in the art that a dispensing system in accordance with the present invention constitutes a substantial improvement over conventional dispensing systems. Advantages include delivery of a constant flow and ratio of liquid components, resulting in a consistent mix. Delivery pumps need not be operated in a pulsing mode. In addition to assuring constant flows to the metering orifices 16a, 16b irrespective of pressure variations of liquid supplies, the valves 20 also serve as check valves preventing reverse flow from the manifold chamber 18 back towards the liquid sources. The system has a minimum of moving parts, making it substantially immune to clogging, and requiring little if any maintenance.

What is claimed is:

1. Apparatus for delivering a non-carbonated beverage mixture comprising:
    a manifold enclosing a mixing chamber;
    a first inlet orifice in the manifold in communication with and sized to admit a metered flow of a first liquid into the mixing chamber;
    a second inlet orifice in the manifold in communication with and sized to admit a metered flow of a second liquid into the mixing chamber, said first and second liquids being combined into a mixture in said mixing chamber; and
    an outlet in the manifold communicating with said mixing chamber and through which the mixture exits the mixing chamber;
    a first constant flow valve in communication with the first inlet orifice and configured to provide a constant flow of the first liquid to the first inlet;
    a second constant flow valve in communication with the second inlet orifice and configured to provide a constant flow of the second liquid to the second inlet; and
    a dispensing mechanism in communication with the outlet.

2. The apparatus of claim 1 further comprising a housing enclosing the manifold, at least part of the outlet, and at least part of the first and second constant flow valves.

3. The apparatus of claim 1, wherein the first constant flow valve comprises a first tubular outlet configured to form a seal with the manifold and the second constant flow valve comprises a second tubular outlet configured to form a seal with the manifold.

4. The apparatus of claim 3, wherein the manifold further comprises a first branch conduit in communication with the first inlet orifice and configured to receive the tubular outlet of the first constant flow valve and a second branch conduit in communication with the second inlet orifice and configured to receive the tubular outlet of the second constant flow valve.

5. The apparatus of claim 4 further comprising a first o-ring disposed between the first tubular outlet and the first branch conduit to form a seal between the manifold and the first constant flow valve and a second o-ring disposed between the second tubular outlet and the second branch conduit to form a seal between the manifold and the second constant flow valve.

6. The apparatus of claim 1 further comprising:
    a discrete supply of the first liquid in communication with the first constant flow valve;
    a pump for moving the first liquid from the discrete supply to the first constant flow valve; and
    a municipal water supply.

7. The apparatus of claim 6, wherein the first constant flow valve comprises a first inlet and wherein the apparatus includes a pump in communication with the first inlet.

8. The apparatus of claim 6 wherein the second constant flow valve comprises a second inlet and wherein second inlet is in communication with the municipal water supply.

9. Apparatus for delivering a non-carbonated beverage mixture comprising:
    a manifold comprising:
        a mixing chamber;
        a first inlet orifice in communication with and sized to admit a metered flow of a first liquid into the mixing chamber;
        a first branch conduit in communication with the first inlet orifice;
        a second inlet orifice in communication with and sized to admit a metered flow of a second liquid into the mixing chamber, said first and second liquids being combined into a mixture in said mixing chamber;
        a second branch conduit in communication with the second inlet orifice; and
        an outlet communicating with said mixing chamber and through which the mixture exits the manifold;
    a first constant flow valve in communication with the first inlet orifice and configured to provide a constant flow of the first liquid to the first inlet, wherein the first constant flow valve comprises a first tubular outlet configured to be received by the first inlet orifice and to form a seal with the manifold;
    a second constant flow valve in communication with the second inlet orifice and configured to provide a constant flow of the second liquid to the second inlet, wherein the first constant flow valve comprises a second tubular outlet configured to be received by the second inlet orifice and to form a seal with the manifold;

a housing enclosing the mixing chamber, at least part of the outlet, and at least part of the first and second constant flow valves;

a dispensing mechanism in communication with the outlet;

a discrete supply of the first liquid in communication with the first constant flow valve;

a pump for moving the first liquid from the discrete supply to the first constant flow valve; and a supply of the second liquid.

* * * * *